No. 844,927. PATENTED FEB. 19, 1907.
F. C. FINKBEINER.
ANIMAL TRAP.
APPLICATION FILED AUG. 1, 1906.
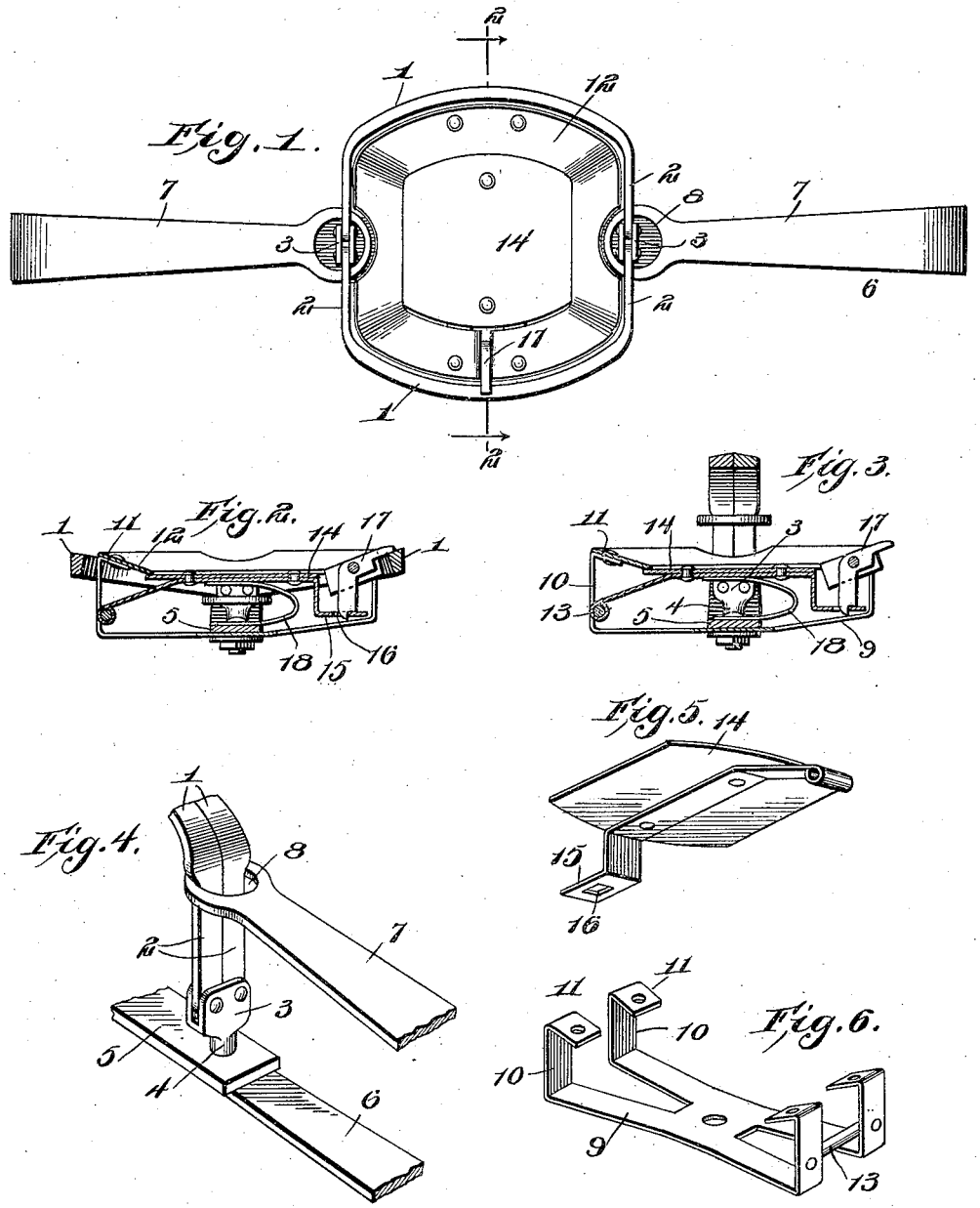
WITNESSES:
INVENTOR
F. C. Finkbeiner
BY Victor J. Evans
Attorney

UNITED STATES PATENT OFFICE.

FREDERICK C. FINKBEINER, OF GRASSRANGE, MONTANA.

ANIMAL-TRAP.

No. 844,927.    Specification of Letters Patent.    Patented Feb. 19, 1907.

Application filed August 1, 1906. Serial No. 328,777.

*To all whom it may concern:*

Be it known that I, FREDERICK C. FINKBEINER, a citizen of the United States, residing at Grassrange, in the county of Fergus and State of Montana, have invented new and useful Improvements in Animal-Traps, of which the following is a specification.

This invention relates to animal-traps of the type embodying a pair of pivoted coöperating trapping members or jaws, coöperating springs for operating said jaws, and a platform-operated trigger for holding the jaws in open position, and has for its objects to provide a comparatively simple inexpensive device of this character wherein the trigger will be properly maintained in locking position, one in which the depressible member or platform will present an extended surface, and one in which the animal's foot will be directed onto the platform, thus insuring proper springing of the trap.

With these and other objects in view the invention comprises the novel features of construction and combination of parts more fully hereinafter described.

In the accompanying drawings, Figure 1 is a top plan view of a trap embodying the invention, showing the same set for use. Fig. 2 is a section taken on the line 2 2 of Fig. 1. Fig. 3 is a similar view showing the jaws in trapping position. Fig. 4 is a detail perspective view of a portion of the trap. Fig. 5 is a perspective view of the depressible member or platform. Fig. 6 is a perspective view of the supporting-frame.

Referring to the drawings, 1 designates the pair of coöperating trapping-jaws which are of substantially U shape and present end portions or arms 2 terminally pivoted in bearing members or heads 3, provided on the fastening-bolts 4, engaged with a longitudinal strap-metal frame piece or bar 5. Engaged respectively with the ends of the bar 5 by means of the bolts 4 is a pair of semielliptic springs 6, having their spring portions or arms 7 provided with terminal openings 8 to receive the end portions 2 of the jaws, while attached to the center of the bar 5 is a transversely-extending frame member 9, having vertically-uprising portions or arms 10, terminating at their upper ends in inturned downwardly-inclined bearing-ears 11, to which is riveted or otherwise secured a substantially rectangular shield 12, the side portions of which are pitched at a downward inclination from their outer toward their inner edges. The shield 12, which is of a size to cover the surface area between the jaws when in open position, has a pair of its side portions recessed to accommodate the adjacent ends of the spring-arms 7, as seen more clearly in Fig. 1. The frame member 9 has extended between a pair of its arms 10 a horizontal pintle 13, on which is pivoted a depressible member or plate 14 of a size equaling that of the central opening in the shield 12 and having a horizontally-projecting yieldable keeper 15, provided with an opening 16 to receive one end of a locking member or trigger 17 in the form of an elbow-lever pivoted in suitable bearings on the shield 12 and adapted for engagement with one of the jaws 1 to hold the same in open position, there being disposed beneath the depressible plate 14 a spring 18 for holding the same in normal position.

In practice when it is desired to set the trap the arms 7 of the springs are depressed to a plane beneath the fulcrums of the jaws 1, thus permitting the latter to be swung outward to a horizontal position, in which position they are locked by means of the trigger 17, which is in turn secured against movement by engaging its lower end with the keeper 15, as before explained and as seen in Fig. 2. With the parts in this condition if an animal steps upon the plate 14 the latter will be depressed against the action of spring 18, thus carrying the keeper out of engagement with the trigger 17 and permitting the jaws to close under the influence of springs 6, as is usual in devices of this class. It will be particularly noted that under my improved construction the depressible plate 14 presents an extended surface to be acted upon by the animal's foot and that the shield 12 will positively direct the animal's foot onto the platform should the animal step anywhere within the open jaws.

Having thus described my invention, what I claim is—

1. An animal-trap comprising a pair of coöperating, pivoted trapping-jaws, actuating-springs adapted to act upon and for moving the jaws to closed position, a depressible member having a keeper, a trigger for locking the jaws in open position and adapted for engagement with said keeper, and a shield marginally surrounding the depressible member and adapted to direct the animal's foot onto the latter.

2. An animal-trap comprising a frame, a pair of coöperating trapping-jaws pivoted in the frame, actuating-springs adapted to act upon and for moving the jaws to closed position, a shield sustained in the frame and having its side portions inclined from their outer toward their inner edges, a pivoted locking member adapted for holding the jaws in open position and a depressible plate having a keeper for engaging the locking member to maintain the same in locking position, said plate being of a size equaling that of the opening in the shield and the plate and shield serving conjointly to close the space between the jaws when in open position.

In testimony whereof I affix my signature in presence of two witnesses.

FREDERICK C. FINKBEINER.

Witnesses:
SAMUEL P. STONER,
CUWENIBY I. GUNNRERE.